United States Patent [19]
Suzuki et al.

[11] Patent Number: 5,955,826
[45] Date of Patent: Sep. 21, 1999

[54] SPARK PLUG WITH BUILT-IN PRESSURE SENSOR

[75] Inventors: Takahiro Suzuki; Kouji Okazaki; Yoshiaki Matsubara; Mamoru Kodera, all of Nagoya, Japan

[73] Assignee: NGK Spark Plug Co., Ltd., Aichi, Japan

[21] Appl. No.: 08/186,515

[22] Filed: Jan. 26, 1994

[30] Foreign Application Priority Data

Feb. 3, 1993 [JP] Japan ..................................... 5-037364
Mar. 31, 1993 [JP] Japan ..................................... 5-094856

[51] Int. Cl.⁶ ..................................................... H01J 13/20
[52] U.S. Cl. ........................... 313/119; 313/142; 313/143
[58] Field of Search ..................................... 313/118, 119, 313/120, 128, 141, 143, 142; 73/115; 123/169 R

[56] References Cited

U.S. PATENT DOCUMENTS

| | | | |
|---|---|---|---|
| 3,079,453 | 2/1963 | Clark | 313/120 |
| 4,267,482 | 5/1981 | Iwata et al. | 313/120 |
| 4,686,861 | 8/1987 | Morii | 73/115 |
| 4,909,071 | 3/1990 | Amano et al. | 73/115 |
| 4,969,353 | 11/1990 | Steinke | 73/115 |
| 4,984,905 | 1/1991 | Amano et al. | |
| 4,996,873 | 3/1991 | Takeuchi | 73/115 |

FOREIGN PATENT DOCUMENTS

6296287  6/1987  Japan .
129554   9/1989  Japan .

*Primary Examiner*—Vip Patel
*Attorney, Agent, or Firm*—Evenson, McKeown, Edwards & Lenahan, P.L.L.C.

[57] ABSTRACT

A threaded portion is formed on a metal shell of a spark plug. Within a mounting base of the metal shell, a pressure sensor is arranged in such a direction that it generates an electrical signal in response to a variation in a tightening load of the spark plug. A slit is formed as a pressure-introducing channel along an axis of the spark plug in the threaded portion of the metal shell so that the slit is communicated with an interior of the mounting base.

7 Claims, 7 Drawing Sheets

SPARK PLUG WITH BUILT-IN PRESSURE SENSOR

BACKGROUND OF THE INVENTION

1) Field of the Invention

This invention relates to a spark plug with a built-in pressure sensor, which is suitable for use in an internal combustion engine. In particular, this invention is concerned with a spark plug with a built-in pressure sensor which, when fitted in an internal combustion engine, is communicated with a combustion chamber of an associated cylinder of the internal combustion engine via a pressure-introducing channel formed in a metal shell of the spark plug.

2) Description of the Related Art

Coupled with the recent move toward internal combustion engines of higher performance, a need has arisen to systematically control combustion of an air-fuel mixture in each combustion chamber of an internal combustion engine. To permit detection of pressure variations due to combustion in each combustion chamber of the internal combustion engine so that knocking in the combustion chamber of the internal combustion engine can be detected, the specific fuel consumption can be improved and exhaust gas can be normalized, certain spark plugs with a built-in pressure sensor have been proposed, including one having a pressure sensor arranged in a mounting base of a metal shell of a spark plug and a gasket disposed on a lower face of the mounting base so that each variation in a tightening load of a spark plug due to combustion gas produced as a result of combustion of an air-fuel mixture in an associated combustion chamber is converted into an electrical signal to permit systematic control of the combustion of the air-fuel mixture in the combustion chamber [Japanese Utility Model Publication (Kokoku) No. HEI 1-29554] as well as one provided with a pressure-introducing bore formed in a metal shell so that the pressure of combustion gas produced as a result of combustion of an air-fuel mixture can be guided directly to a pressure sensor disposed in a mounting base of the metal shell [Japanese Utility Model Laid-Open (Kokai) No. SHO 62-96287].

Figure 6A:
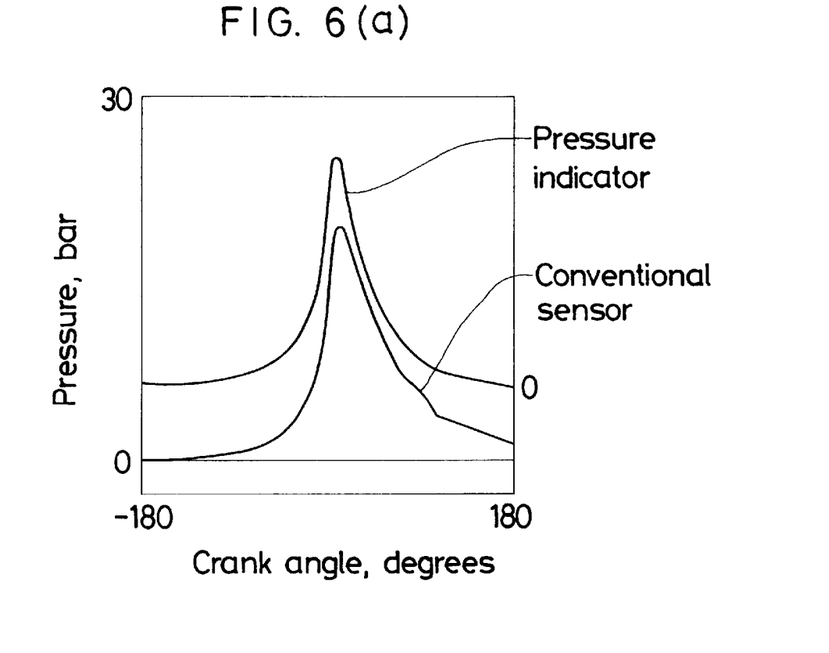
FIG. 6(a) is a diagrammatic comparison in combustion pressure waveform between a conventional pressure sensor and the pressure indicator.
Figure 6B:
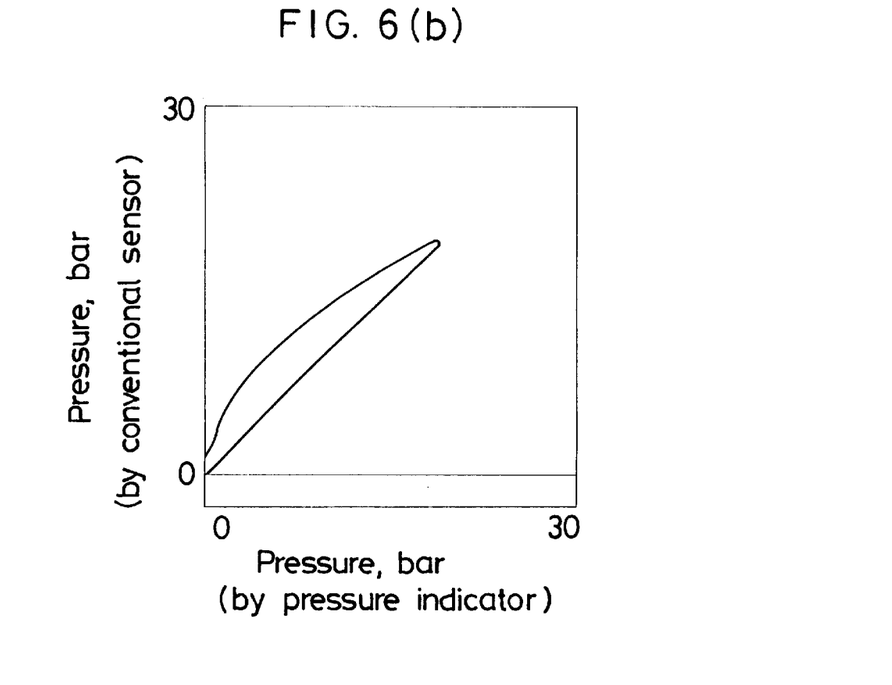
FIG. 6(b) is a Lissajou's diagram of output signals of the conventional pressure sensor versus corresponding pressures measured by the pressure indicator.

The conventional constructions referred to above are however not fully satisfactory. In the construction disclosed in Japanese Utility Model Publication (Kokoku) No. HEI 1-29554, what are detected by the pressure sensor arranged in the mounting base of the metal shell are variations in a tightening load of the spark plug on the mounting base of the internal combustion engine. Each variation in the tightening load of the spark plug is caused by a combination of a pressure—which is applied to an igniting part of the spark plug in a direction opposite to the direction of the tightening load by combustion gas produced as a result of combustion of an air-fuel mixture in the combustion chamber—and a pressure applied to the mounting base of the metal shell in a direction opposite to the direction of the tightening load of the spark plug by the combustion gas flowed through a space formed in a threaded portion of the metal shell. The space through which the combustion gas is allowed to flow in and out is extremely small so that, upon passage of the in-coming and out-going combustion gases through the space, the out-going combustion gas develops resistance to the in-coming combustion gas. This resistance therefore reduces the flow rate of the in-coming combustion gas, resulting in the formation of a deformation in the composite waveform. This leads to a lag in the control of the ignition timing or the like by the electrical signal outputted from the pressure sensor in response to the variation in the tightening load. When an output of the pressure sensor is actually measured by a pressure indicator on a commercial internal combustion engine, a shift is observed between an output waveform of the pressure sensor and a combustion pressure waveform measured by the pressure indicator. This construction is therefore accompanied by the drawback that it is insufficient in accuracy [see FIGS. 6(a) and 6(b)].

To overcome the above drawback, those having a pressure-introducing channel in a metal shell have been proposed as in Japanese Utility Model Laid-Open (Kokai) No. SHO 62-96287 so that the pressure of combustion gas produced as a result of combustion of an air-fuel mixture can be directly guided to a pressure sensor disposed in a mounting base of the metal shell. The formation of the pressure-introducing channel in the metal shell however requires difficult machining. Further, the pressure sensor is exposed directly to combustion gas of high pressure so that its mounting strength and its own durability must be high. In addition, it is impossible to fully eliminate the above-described lag in control which occurs due to resistance to an in-coming flow of combustion gas by an out-going flow of combustion gas through the pressure-introducing channel.

In the case of the construction that a pressure sensor itself is built in a mounting base of a metal shell of a spark plug, the whole spark plug must be replaced by a new one even if the pressure sensor alone fails. This leads to the disadvantage that an extra expense is unavoidable.

SUMMARY OF THE INVENTION

An object of the present invention is to overcome the above-described drawbacks of the conventional constructions and hence to provide a spark plug with a built-in pressure sensor, which permits accurate measurement of variations in a tightening load of the spark plug by the pressure sensor arranged in a mounting base of a metal shell despite its simple construction and further easy replacement of the pressure sensor by a new pressure sensor should the pressure sensor alone fail.

In one aspect of the present invention, there is thus provided a spark plug with a built-in pressure sensor. The spark plug is suitable for use in an internal combustion engine. The pressure sensor is built in a mounting base of a metal shell in a direction to convert a variation in a tightening load of the spark plug on a cylinder head of the internal combustion engine into an electrical signal. The metal shell is provided with at least one pressure-introducing channel to communicate a combustion chamber of an associated cylinder of the internal combustion engine with the pressure sensor.

Preferably, the pressure-introducing channel is a slit formed along an axis of the spark plug in a threaded portion of the metal shell. The slit desirably flares in a direction away from the pressure sensor.

In a preferred embodiment, the pressure sensor can be in the form of a discrete unit comprising an annular metal housing, a plate packing, a sealing packing and a pair of piezoelectric elements with an electrode plate interposed between the piezoelectric elements. The plate packing, the sealing packing, the piezoelectric elements and the electrode are hermetically accommodated within the housing. The pressure sensor is fixedly held between the mounting base and the cylinder head.

Owing to the above-described construction, combustion gas produced as a result of combustion of an air-fuel mixture in the combustion chamber of the internal combustion engine flows in through the pressure-introducing channel through which the combustion gas is allowed to flow into the mounting base of the metal shell in which the pressure sensor is built in a direction to convert each variation in the tightening load of the spark plug into an electrical signal. When knocking or the like occurs, the tightening load of the spark plug on the mounting base of the metal shell is caused to vary so that the pressure sensor built in the mounting base generates an electrical signal in response to the variation in the tightening load of the spark plug. It is therefore possible to control the ignition timing or the like.

The combustion gas of the air-fuel mixture, which has once flowed in through the pressure-introducing channel communicating to the mounting base of the metal shell, for example, through the slit formed in the threaded portion of the metal shell is then discharged flowing through the same slit again. The slit has a large width, especially in the case of the slit formed in the threaded portion of the metal shell, so that the out-going combustion gas develops only smaller resistance to the in-coming flow of combustion gas produced as a result of combustion of the air-fuel mixture in the following cycle and flowing into the mounting base of the metal shell through the slit. It is therefore possible to substantially eliminate a delay or lag in the conversion into an electrical signal by the pressure sensor, which delay or lag would otherwise occur due to resistance developed by an out-going flow of combustion gas against an in-coming flow of combustion gas. Sufficient accuracy can therefore be brought about.

Where the pressure sensor is in the form of the discrete unit and is fixedly held between the mounting base of the metal shell, the tightening load of the spark plug varies upon application of a pressure of combustion gas, which has been produced in the combustion chamber, to the mounting base of the metal shell through the slit. Responsive to such a variation in the tightening load, the output of the pressure sensor varies. It is therefore possible to achieve accurate and fail-free control of the ignition timing depending on the combustion of the air-fuel mixture in the combustion chamber. Further, even if the pressure sensor alone should fail, the failed pressure sensor can be readily replaced by a new one. It is therefore possible to perform more precise control of the internal combustion engine.

BRIEF DESCRIPTION OF THE DRAWINGS

The above and other objects, features and advantages of the present invention will become apparent from the following description and the appended claims, taken in conjunction with the accompanying drawings in which:

DETAILED DESCRIPTION OF THE INVENTION AND PREFERRED EMBODIMENTS

Figure 1:
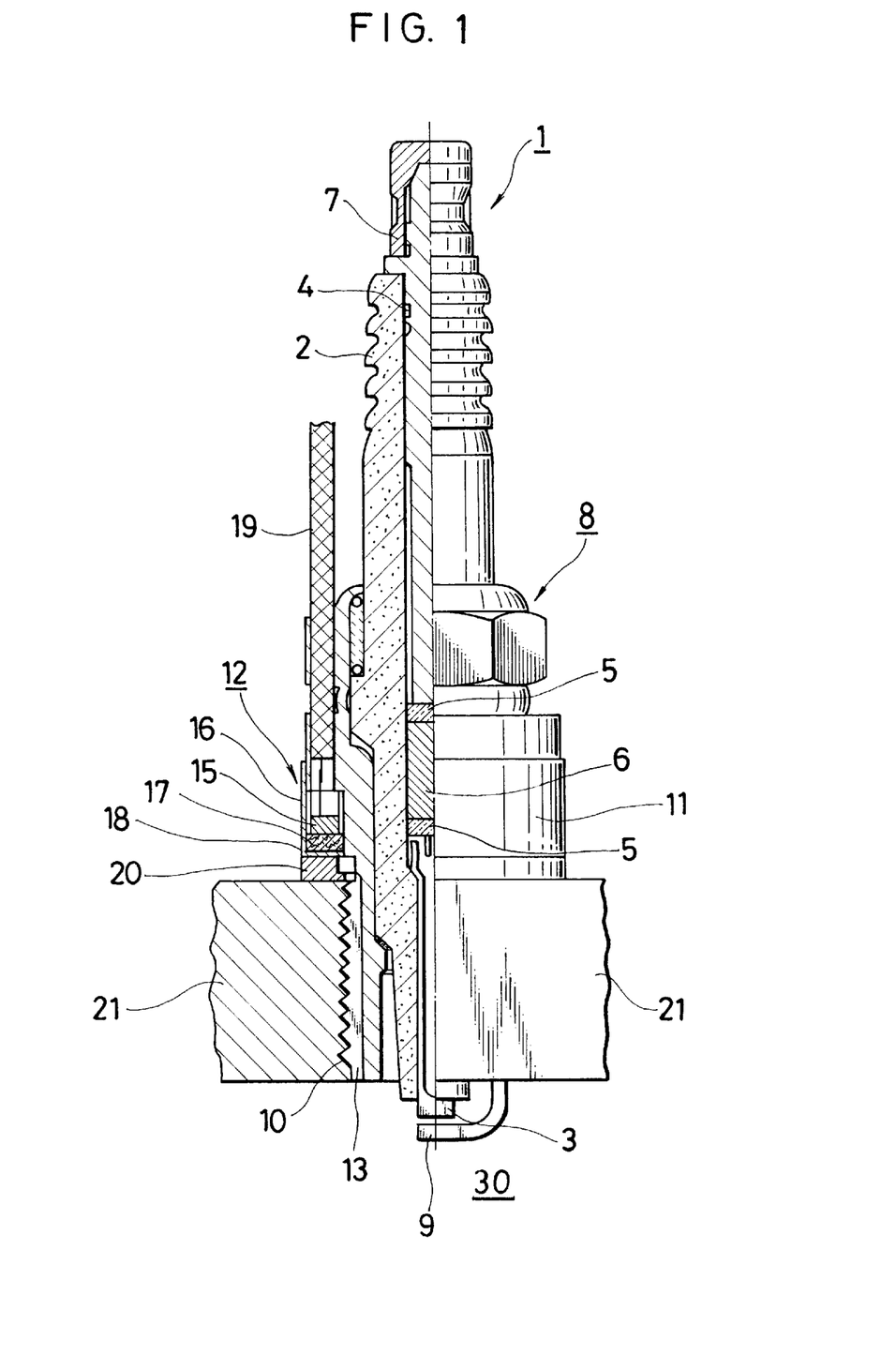
FIG. 1 is a fragmentary cross-sectional view of a spark plug with a built-in pressure sensor, according to a first embodiment of the present invention.
Figure 2:
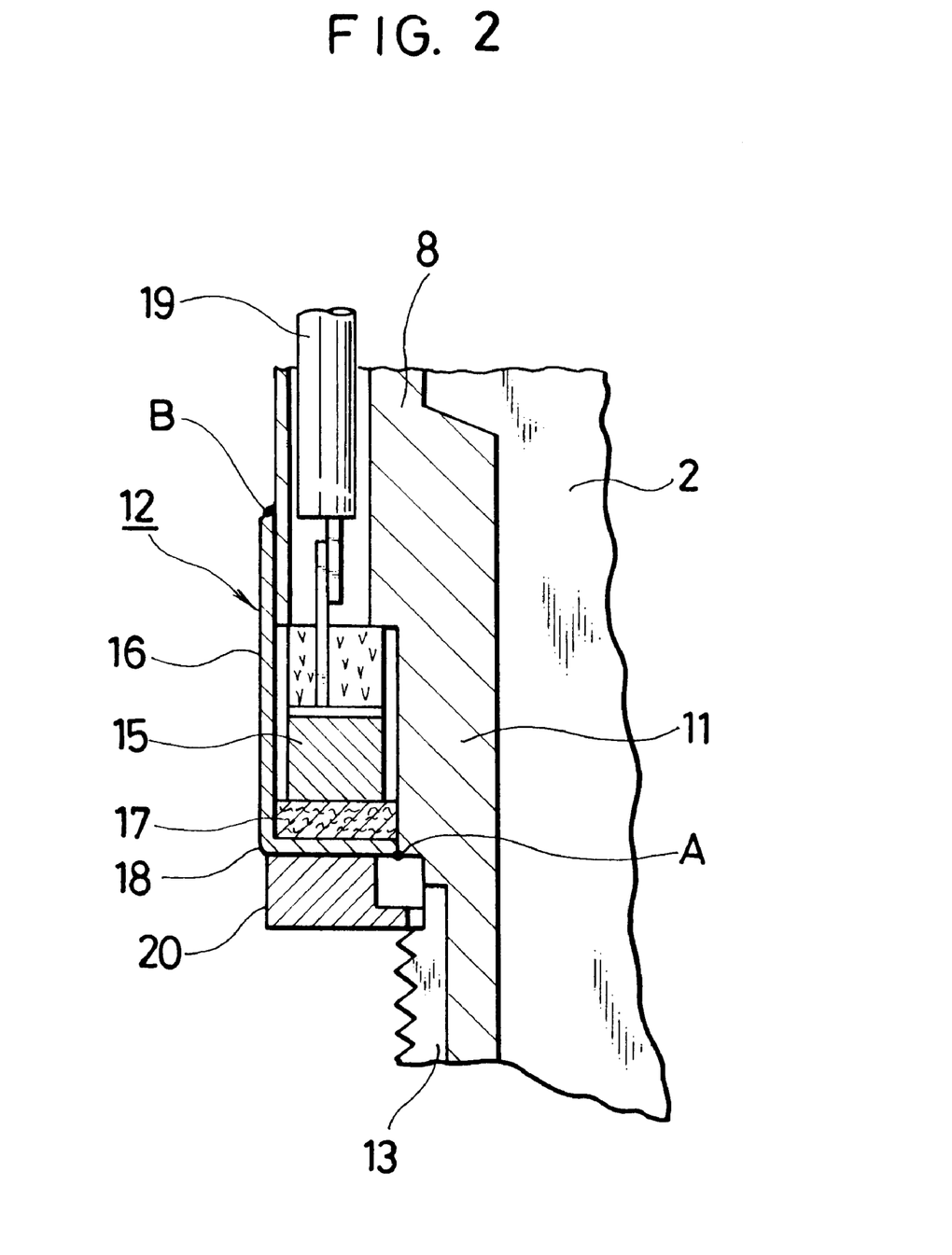
FIG. 2 is an enlarged fragmentary cross-sectional view of the spark plug shown in FIG. 1.
Figure 3:
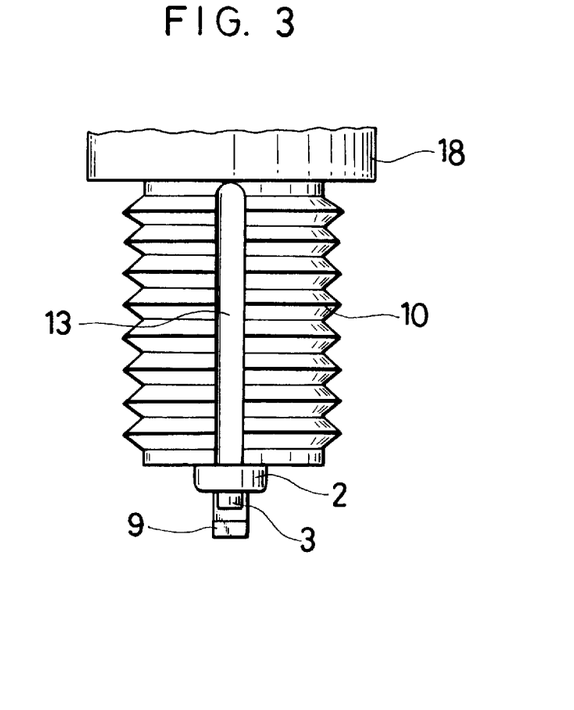
FIG. 3 is an enlarged fragmentary cross-sectional view of the spark plug shown in FIG. 1.

The first embodiment of the present invention will first be described with reference to FIG. 1 through FIG. 3. Numeral 1 indicates the spark plug with the built-in pressure sensor, according to the first embodiment of the present invention. This spark plug 1 is constructed of an insulator 2 and a metal shell 8 fixedly holding the insulator 2 therein. The insulator 2 defines an axial bore 4 therethrough. A center electrode 3 extending out from an end of the insulator 2 is held or sealed and fixed in the axial bore 4. Behind the center electrode 3, a resistor 6, which is held at opposite ends thereof by conductive glass seals 5, and a terminal electrode 7 are also held or sealed and fixed in the axial bore 4. The metal shell 8 carries a ground electrode 9 at a position located opposite an end portion of the center electrode 3. A threaded portion 10 is formed on the metal shell 8 so that, when mounting the spark plug 1 on an internal combustion engine, the threaded portion 10 can be threadedly fixed in a plug hole. In a mounting base 11 with a plate-shaped gasket 20 arranged in close contact with a peripheral edge portion of the plug hole in a lower end portion of a cylinder head 21, a pressure sensor 12 is built. In the pressure sensor 12, an annular piezoelectric element 15 is held between an insulating plate 16 and a plate packing 17 and is accommodated in a ring-shaped metal housing 18 having an approximately L-shaped transverse cross-section. The metal housing 18 is sealed at both end portions thereof by laser welds A,B or the like. The pressure sensor 12 is connected to a lead wire 19 which transmits an electrical signal generated responsive to a variation in a tightening load of the spark plug.

The pressure sensor 12 built in the mounting base 11 of the metal shell 8 is arranged in such a direction that it generates an electrical signal in response to a variation in the tightening load of the spark plug 1. A slit (for example of about 2 mm in width and about 1 mm in depth where the threads of the threaded portion 10 are M14 threads) is formed as a pressure-introducing channel along an axis of the plug 1 in the threaded portion 10 of the metal shell 8 so that the slit 13 is communicated with an interior of the mounting base 11 in which the pressure sensor 12 is built (see FIG. 3).

As the spark plug according to the first embodiment of the present invention has the construction described above, combustion gas produced as a result of combustion of an air-fuel mixture in a combustion chamber 30 of the internal combustion engine flows in through a pressure-introducing channel which allows the combustion gas to flow into the mounting base 11 of the metal shell 8 with the pressure sensor 12 built therein in the direction to convert each variation in the tightening load of the spark plug 1 into an electrical signal, namely, through the slit 13 formed in the threaded portion 10 of the metal shell 8. Upon occurrence of knocking or the like, the tightening load of the spark plug on the mounting base 11 of the metal shell 8 is thereof caused to vary without any delay. The pressure sensor 12 built in the mounting base 11 therefore generates an electrical signal in response to the variation in the tightening load, thereby making it possible to control the ignition timing to an optimal one.

The combustion gas of the air-fuel mixture, which has flowed in through the pressure-introducing channel communicating to the interior of the mounting base 11 of the metal shell 8, that is, through the slit 13 formed in the threaded portion 10 of the metal shell is discharged flowing again through the same slit 13. The slit 13 has a large width so that the out-going combustion gas develops only smaller resistance to combustion gas produced as a result of combustion of a newly-supplied air-fuel mixture and flowing into the mounting base 11 of the metal shell 8 through the slit 13. It is therefore possible to substantially eliminate a delay or lag in the conversion into an electrical signal by the pressure sensor 12, which delay or lag would otherwise occur due to resistance developed by an out-going flow of combustion gas against an in-coming flow of combustion gas. Sufficient accuracy can therefore be brought about with respect to the control of the ignition timing or the like.

It is most desired to make the thickness of the plate-shaped gasket 20 large enough to prevent its deformation so that, when the spark plug 1 is mounted, the plate-shaped gasket 20 is protected from deformation upon its close contact with the peripheral edge portion of the plug hole of the internal combustion engine and does not interfere with combustion gas flowing in and out through the slit 13. With respect to the slit 13 formed in the threaded portion 10 of the metal shell 8, plural slits can be formed to eliminate a variation in accuracy due to the directionality of the spark plug 1 upon its mounting.

Figure 4:
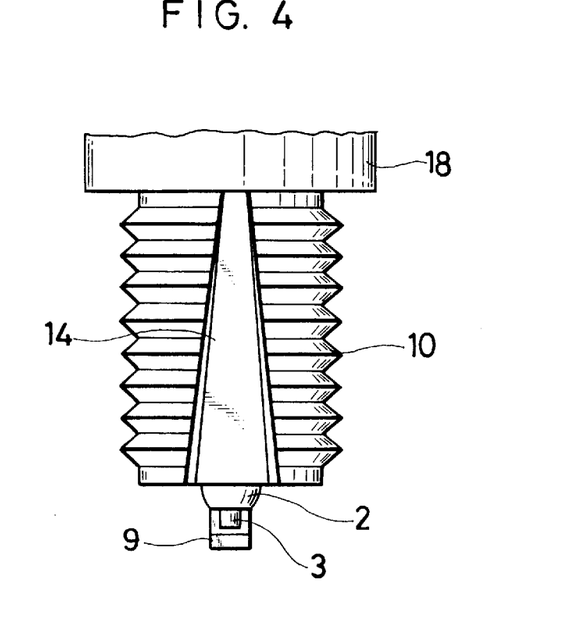
FIG. 4 is an enlarged fragmentary front view showing a modification of a pressure-introducing channel in the first embodiment.

In the first embodiment, the pressure-introducing channel through which combustion gas produced as a result of combustion of an air-fuel mixture in the combustion chamber 30 of the internal combustion engine is guided to the interior of the mounting base 11 of the metal shell 8, said interior accommodating the pressure sensor 12 built therein, can be formed as a slit 14 which, as illustrated in FIG. 4, flares downwardly to present a sectorial shape. This slit 14 can further reduce columnar vibrations by combustion gas of an air-fuel mixture and can further enhance the accuracy of the control of the ignition timing or the like.

Figure 5A:
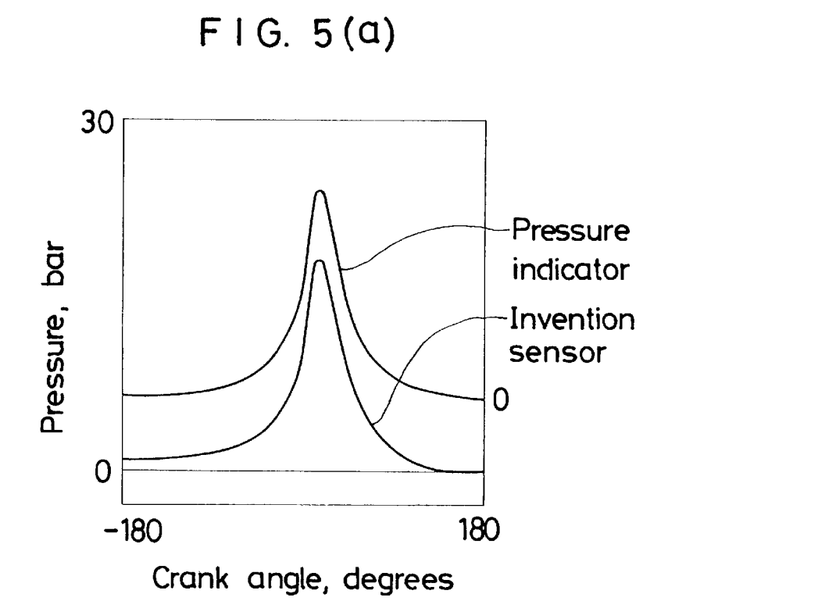
FIG. 5(a) is a diagrammatic comparison in combustion pressure waveform between the pressure sensor of the spark plug according to the first embodiment of the present invention and a pressure indicator.
Figure 5B:
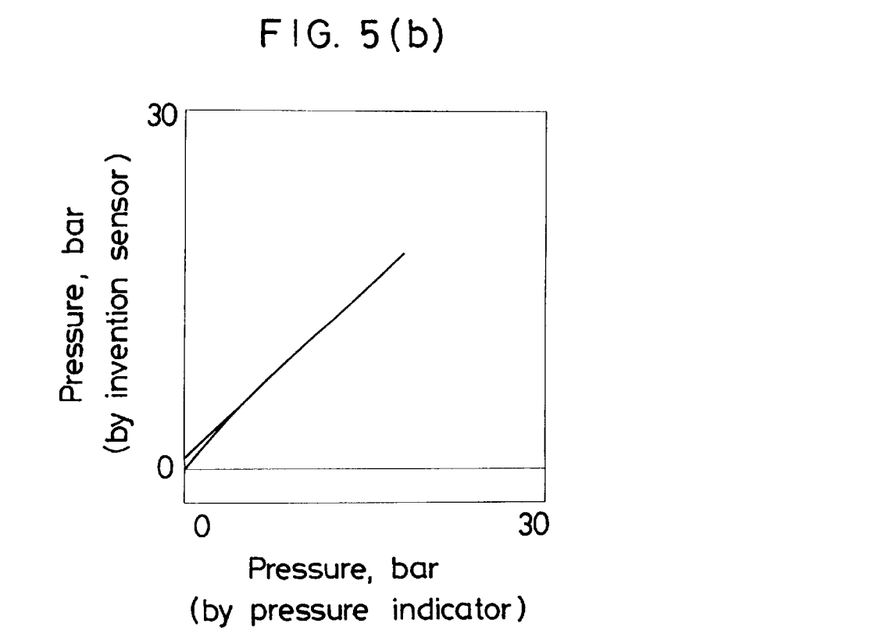
FIG. 5(b) is a Lissajou's diagram of output signals of the pressure sensor versus corresponding pressures measured by the pressure indicator.

With respect to the spark plug 1 with the built-in pressure sensor, which pertains to the first embodiment of the present invention, a combustion pressure waveform measured by the pressure indicator and that obtained by the pressure sensor 12 were compared at 1,500 rpm and 50% load. Further, their Lissajous's diagrams were also measured. As a result, it was confirmed that the output waveform obtained by the pressure sensor 12 had a similar rise to the combustion pressure waveform determined by the pressure indicator [see FIG. 5(a)] and further that the Lissajous's diagram of the pressure indicator was exactly the same as that of the outputs of the pressure sensor 12. The pressure sensor 12 can therefore produce outputs in response to variations in the combustion of the air-fuel mixture in the combustion chamber 30 of the internal combustion engine. Further, their Lissajous's diagrams conform with each other [see FIG. 5(b)]. The spark plug according to the first embodiment of the present application has hence been confirmed to be able to perform high-accuracy control.

Figure 7:
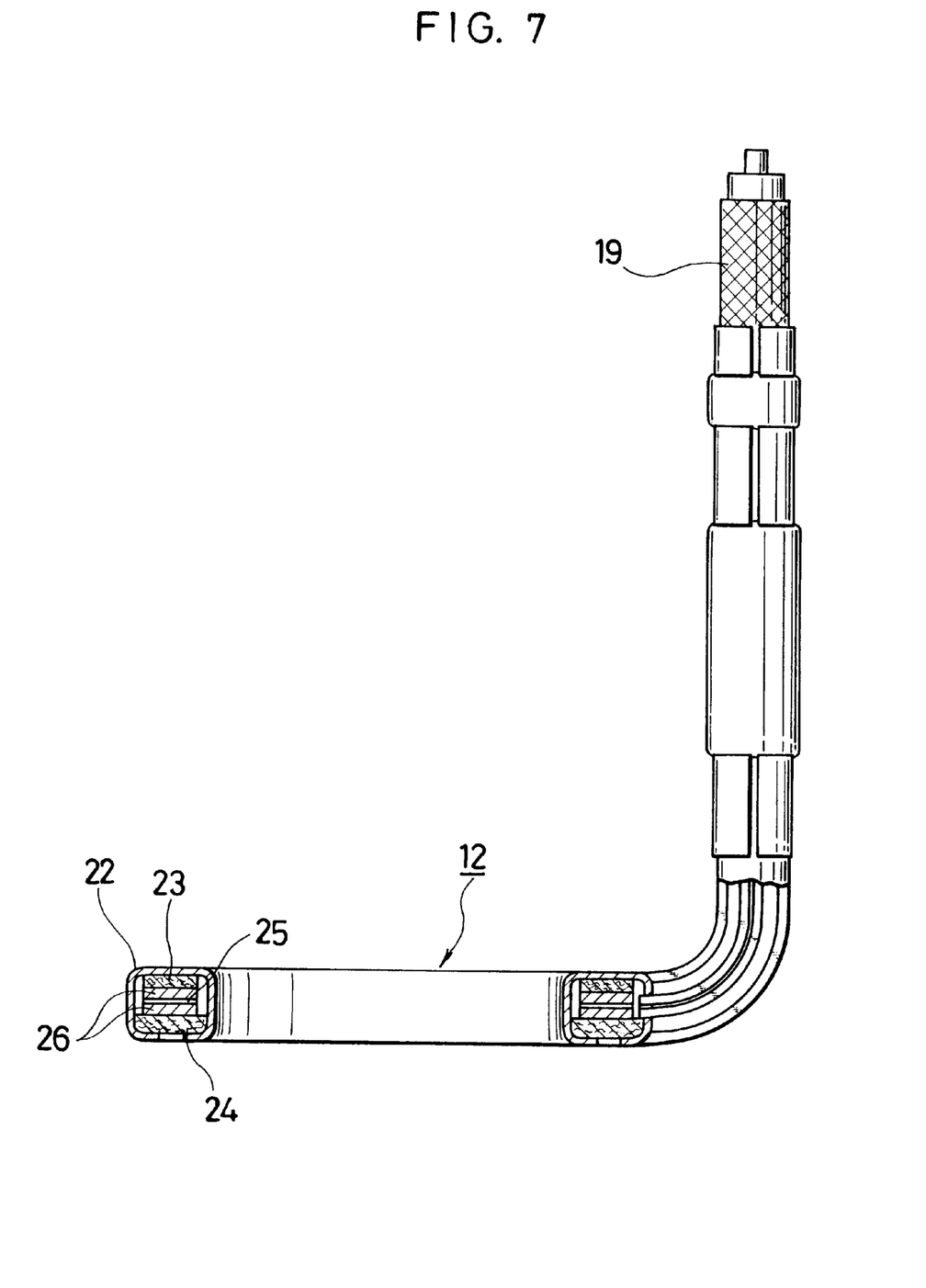
FIG. 7 is an enlarged fragmentary cross-sectional view of a pressure sensor in a spark plug with the built-in pressure sensor, according to a second embodiment of the present invention.
Figure 8:
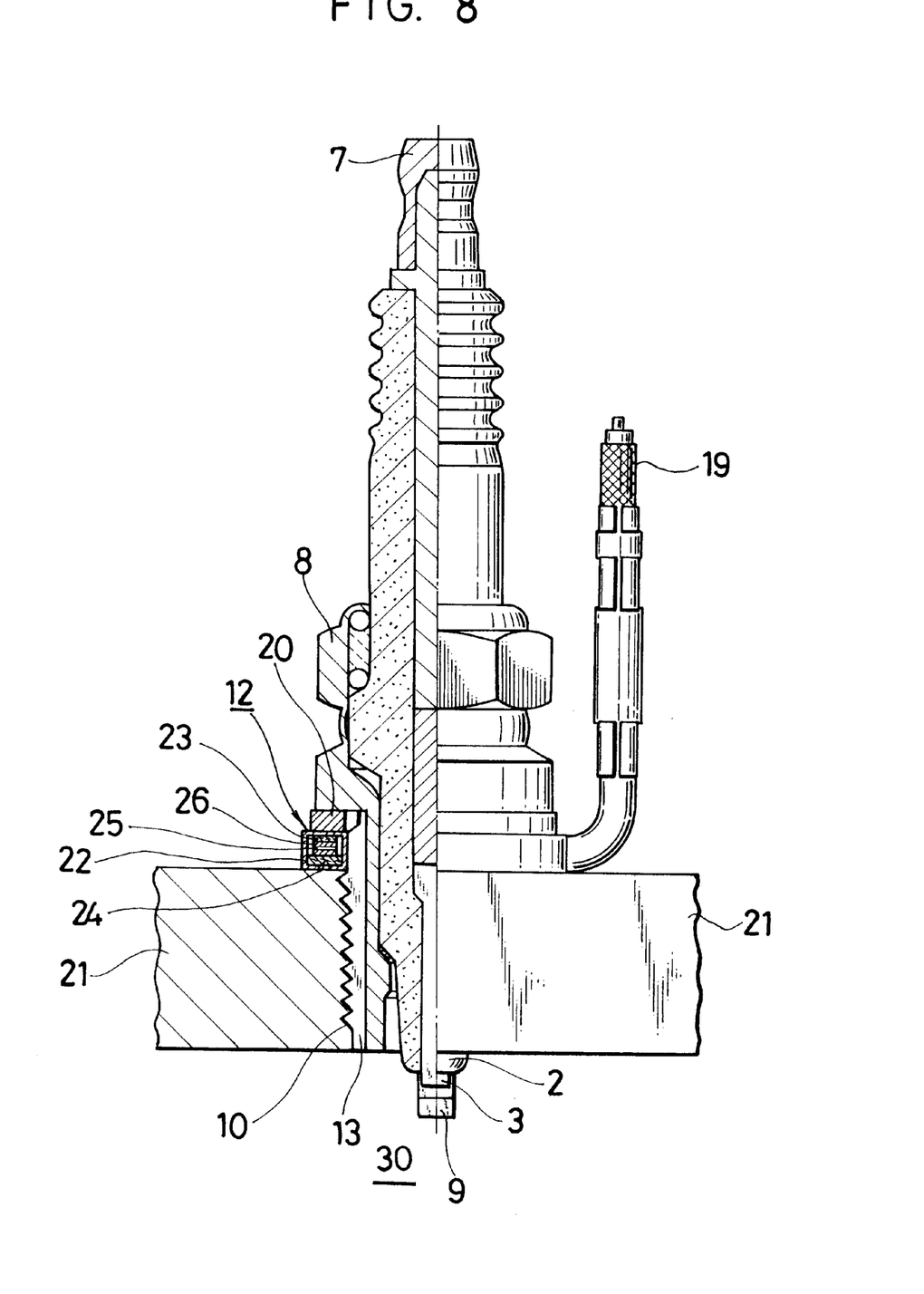
FIG. 8 is an enlarged fragmentary cross-sectional view of the spark plug with the built-in pressure sensor according to the second embodiment of the present invention, in which the state of mounting of the pressure sensor is illustrated.

The second embodiment of the present invention is illustrated in FIGS. 7 and 8. A pressure sensor 12 built in the mounting base 11 of the metal shell 8 has been hermetically constructed as a discrete unit by accommodating a pair of piezoelectric elements 26, with an electrode plate 25 interposed therebetween, together with a plate packing 23 and a sealing packing 24 in an annular metal housing 22 having a U-shaped cross-section and crimping edge portions of the metal housing 22 (see FIG. 7). The sensor 12 is fixedly held between the mounting base 11 of the metal shell 8, which is provided as a pressure-introducing channel with one or more slits 13 formed in the threaded portion 10 of the metal shell 8, and the cylinder head 21 (see FIG. 8). Combustion gas produced in the combustion chamber 30 applies a pressure to the mounting base 11 of the metal shell 8 through the slit 13 so that the tightening load of the spark plug 1 is caused to vary. Responsive to a variation in the tightening load, the output of the pressure sensor 12 fixedly held between the mounting base 11 of the metal shell 8 and the cylinder head 21 varies. Depending on such variations in the output, the ignition timing or the like can be controlled accurately and precisely in accordance with the state of combustion of the air-fuel mixture in the combustion chamber 30. If the pressure sensor 12 alone should fail, it is possible to easily and correctly replace only the pressure sensor 12 without replacing the spark plug 1 itself.

What is claimed is:

1. A spark plug with a built-in pressure sensor, said spark plug being suitable for use in an internal combustion engine, wherein the pressure sensor is built in a mounting base of a metal shell in a direction to convert a variation in a tightening load of said spark plug on a cylinder head of said internal combustion engine into an electrical signal, said metal shell being provided with at least one pressure-introducing channel to communicate a combustion chamber of an associated cylinder of said internal combustion engine with the pressure sensor, said pressure-introducing channel being a slit formed along an axis of said spark plug on a threaded portion of said metal shell.

2. A spark plug according to claim 1, wherein said slit flares in a direction away from said pressure sensor.

3. A spark plug according to claim 1, wherein said pressure sensor is in the form of a discrete unit comprising an annular metal housing, a plate packing, a sealing packing and a pair of piezoelectric elements with an electrode plate interposed between said piezoelectric elements, said plate packing, sealing packing, piezoelectric elements and electrode being hermetically accommodated within said housing; and said pressure sensor is fixedly held between said mounting base and said cylinder head.

4. A spark plug according to claim 2, wherein said pressure sensor is in the form of a discrete unit comprising an annular metal housing, a plate packing, a sealing packing and a pair of piezoelectric elements with an electrode plate interposed between said piezoelectric elements, said plate packing, sealing packing, piezoelectric elements and electrode being hermetically accommodated within said housing; and said pressure sensor is fixedly held between said mounting base and said cylinder head.

5. A spark plug with a built in pressure sensor for use in an internal combustion engine, comprising:

a threaded section extending over a threaded length of the spark plug and serving to threadably hold the spark plug in an in-use position at an internal combustion engine, a pressure sensor disposed spaced from the threaded length, and at least one pressure-introducing channel for communicating a combustion chamber of the engine with the pressure sensor, said at least one pressure-introducing channel being formed as a slit which interrupts said threaded section and extends over the threaded section along an axis of the spark plug.

6. A spark plug according to claim 5, wherein said slit is tapered from a widest flow cross section at an end of the threaded length disposed opposite the pressure sensor.

7. A spark plug according to claim 6, wherein said pressure sensor is in the form of a discrete unit comprising an annular metal housing, a plate packing, a sealing packing and a pair of piezoelectric elements with an electrode plate interposed between said piezoelectric elements, said plate packing, sealing packing, piezoelectric elements and electrode being hermetically accommodated within said housing; and said pressure sensor is fixedly held between said mounting base and said cylinder head.

* * * * *